No. 897,684. PATENTED SEPT. 1, 1908.
F. A. VOGT.
CHEESE COVER.
APPLICATION FILED MAR. 24, 1908.
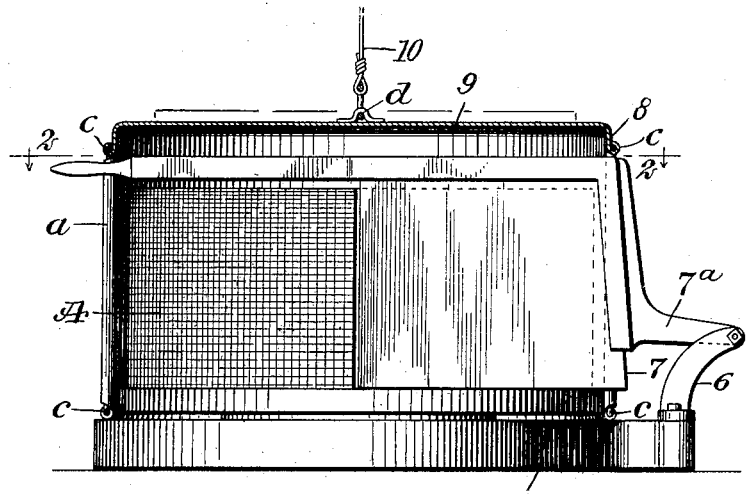
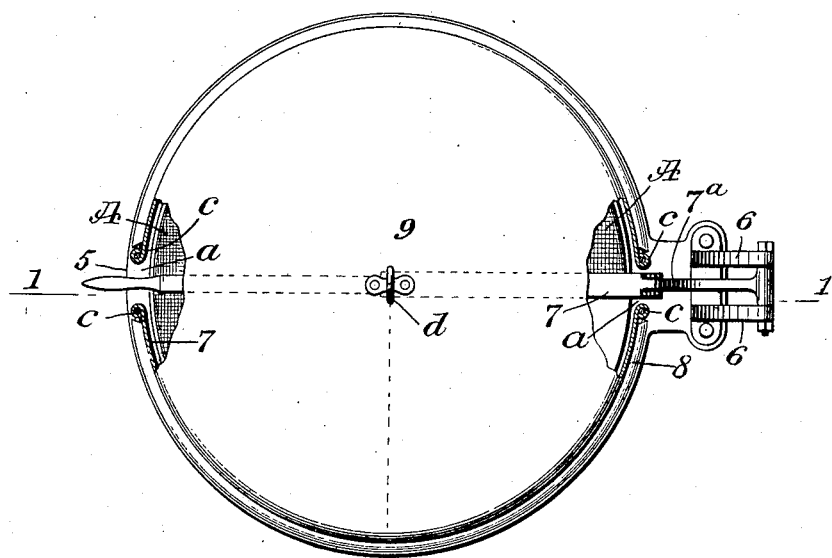
WITNESSES
INVENTOR
Frank A. Vogt
BY Munn & Co
ATTORNEYS

UNITED STATES PATENT OFFICE.

FRANK A. VOGT, OF ANDERSON, INDIANA.

CHEESE-COVER.

No. 897,684.   Specification of Letters Patent.   Patented Sept. 1, 1908.

Application filed March 24, 1908. Serial No. 423,038.

*To all whom it may concern:*

Be it known that I, FRANK A. VOGT, a citizen of the United States, and a resident of Anderson, in the county of Madison and State of Indiana, have invented a new and Improved Cheese-Cover, of which the following is a full, clear, and exact description.

The purpose of this invention is to provide a cheese cover of novel construction, that affords protection to cheese from dust and insects, and that will also inclose the usual cheese cutter which may remain in place for service as occasion requires, and a further object is to provide suspending means for the cover to enable its convenient removal from the cheese when this is desired.

The invention consists in the novel construction of the cheese cover, as is hereinafter described and claimed.

Reference is to be had to the accompanying drawings forming a part of this specification, in which similar characters of reference indicate corresponding parts in both views.

Figure 1 is a sectional side view, substantially on the line 1—1 in Fig. 2; and Fig. 2 is a partly sectional plan view, substantially on the line 2—2 in Fig. 1.

To facilitate the cutting of slices from a cheese to accommodate retail trade, it is common to employ a cheese cutting device, such as is shown in the drawings, which briefly described, consists of a baseboard 5 whereon a cheese A is seated, spaced arms 6 secured on the baseboard near its edge, and a cutter bar 7 pivoted by one end on the upper end of an angle lever 7ª that is pivoted at its lower end between the arms 6.

Wooden covers that are usually the factory shipping boxes for the cheese, have ordinarily been utilized to keep dust and flies from a cheese that has been cut for retail purposes. Such a cover is clumsy, heavy and unsightly; furthermore, being unpolished and porous, it is unsanitary and does not protect the cheese.

The improved cover of my invention, as shown, is formed of plate metal having a cylindrical side wall 8 and a circular top wall 9 which is secured at its edge upon the upper edge of the side wall 8.

The height and diameter of the cylindrical side wall 8 are so proportioned to like dimensions of a cheese A, that the cover will pass down loosely over it and at its lower edge, rest upon the baseboard 5.

In the side wall 8, at diametrically opposite points, two vertical slots *a, a,* are formed in said side wall, these slots having such width as will adapt them to permit the introduction thereinto of the handle and angle lever of the cutting device. The edges of the slots *a* and the bottom edge of the side wall 8, are rendered tubular and strengthened further by the insertion of a wire core thereinto, as is shown at *c* in the drawings.

It is important that the cover complete be coated with non-oxidating paint or enamel, and preferably the interior coating is black, which will repel insects.

From the center of the top wall 9, on a bracket loop *d*, a flexible supporting wire 10 is extended to a point of overhead support, and may be connected with a counterbalance weight if this is desired.

It will be seen from the foregoing description, that the improved cheese cover is very convenient, will protect a cheese from dust and insects, is neat and sanitary and may be produced at a low cost.

Having thus described my invention, I claim as new and desire to secure by Letters Patent:

As a new article of manufacture a cover for a cheese supported on a cheese cutter, comprising a metallic body having a cylindrical wall and a circular top and provided in its walls with oppositely arranged slots, said slots extending from near the top out through the lower edge and having their edges reinforced.

In testimony whereof I have signed my name to this specification in the presence of two subscribing witnesses.

FRANK A. VOGT.

Witnesses:
 W. S. ELLIS,
 ARTHUR C. CALL.